(12) United States Patent
Maxwell et al.

(10) Patent No.: US 7,584,299 B2
(45) Date of Patent: Sep. 1, 2009

(54) CONFIGURATION OF VPNS

(75) Inventors: David John Maxwell, Edinburgh (GB); Robert Duncan, Edinburgh (GB); Steven James Urouhart, Edinburgh (GB); Mike Moran, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 571 days.

(21) Appl. No.: 11/192,771

(22) Filed: Jul. 29, 2005

(65) Prior Publication Data

US 2006/0259963 A1    Nov. 16, 2006

(30) Foreign Application Priority Data

May 12, 2005    (GB) ................................ 0509720.9

(51) Int. Cl.
*G06F 15/16* (2006.01)
(52) U.S. Cl. .................. 709/238; 709/220; 709/223
(58) Field of Classification Search ................ 709/238, 709/220, 223
See application file for complete search history.

(56) References Cited

U.S. PATENT DOCUMENTS

| 6,061,735 | A | * | 5/2000 | Rogers ........................ 709/239 |
| 6,079,020 | A | * | 6/2000 | Liu ............................. 726/15 |
| 6,662,221 | B1 | | 12/2003 | Gonda et al. |
| 6,965,559 | B2 | * | 11/2005 | Grabauskas et al. ......... 370/216 |
| 7,058,702 | B2 | * | 6/2006 | Hogan ........................ 709/220 |
| 2003/0093509 | A1 | * | 5/2003 | Li et al. ...................... 709/223 |

FOREIGN PATENT DOCUMENTS

| GB | 2426141 | 11/2006 |
| WO | WO 02/056195 A1 | 7/2002 |

OTHER PUBLICATIONS

Great Britain Combined Search and Examinatin Report.

* cited by examiner

*Primary Examiner*—Ario Etienne
*Assistant Examiner*—Andrew Georgandellis

(57) ABSTRACT

The gateway devices in a VPN require configuration when the VPN is set up and to reflect changes. To process the configuration tasks efficiently, a method is described of configuring a virtual private network (VPN) within a shared network, in which a queue of configuration tasks is created for gateway devices belonging to the VPN. The configuration tasks include sending static network routing information to said gateway devices. The tasks are deployed by retrieving a next task from the queue, and interrogating the gateway device to which the task relates, to identifying any change in subnetworks connected thereto since the task was created. If no change is identified, the retrieved task is performed. If, on the other hand, a change is identified, update configuration tasks are created for all relevant gateway devices in the VPN. The update task for each gateway device is then merged with any not yet performed task in the queue for that gateway device, and the task retrieved from the queue merged with the and update task is performed.

6 Claims, 2 Drawing Sheets

CONFIGURATION OF VPNS

This invention relates to the configuration of a virtual private network (VPN).

The gateway devices in a VPN require configuration when the VPN is set up and to reflect changes. Methods for configuring VPNs automatically are described in U.S. Pat. Nos. 6,662,221, 6,516,417, 6,330,562 and 6,079,020. In configuring a large VPN, it is possible that the number of configuration tasks to perform is so great that the network has changed before all the tasks are complete.

To process the configuration tasks more efficiently, the invention provides a method of configuring a virtual private network (VPN) within a shared network, comprising: the steps of creating a queue of configuration tasks for gateway devices belonging to the VPN, said configuration tasks including sending static network routing information to said gateway devices; and repeatedly retrieving a next task from the queue, interrogating the gateway device to which the task relates, to identifying any change in subnetworks connected thereto since the task was created; if no change is identified, performing the retrieved task; or if a change is identified, creating update tasks for all relevant gateway devices in the VPN; merging the update task for each gateway device with any not yet performed task for that gateway device; and performing the merged retrieved and update tasks.

The invention provides apparatus for configuring a virtual private network (VPN) within a shared network, comprising: means for creating a queue of configuration tasks for gateway devices belonging to the VPN, said configuration tasks including sending static network routing information to said gateway devices; and repeatedly retrieving a next task from the queue, means for interrogating the gateway device to which the task relates, to identifying any change in subnetworks connected thereto since the task was created; if no change is identified, performing the retrieved task; or if a change is identified, creating update configuration tasks for all relevant gateway devices in the VPN; means for merging the update task for each gateway device with any not yet performed task for that gateway device; and performing the task retrieved from the queue merged with the update task.

A gain in efficiency is made in two respects. By interrogating the gateway device before a configuration task is performed and modifying the task if there is any change in subnetworks connected to the device, configuring the device once and then again to reflect the change is avoided. Similarly, configuring devices which for there are tasks which have not yet reached the head of the queue, and then configuring them again to reflect the change, is avoided. Both lead to more efficient processing of the tasks.

The invention also extends to a computer program on computer readable medium loadable into a digital computer or embodied in a carrier wave, said computer program comprising software for performing the steps of the inventive method.

One embodiment of the invention will now be described with reference to the accompanying drawings in which.

The preferred embodiment allows only simple VPN topology and routing rules e.g. a choice of hub and spoke or full mesh. It uses automatic retrieval of network configuration. It has an efficient deployment and update algorithm. Taken together, these allow large VPN topology and static routing configurations to be generated, deployed to the appropriate devices and easily updated.

VPN Rules

Figure 1:
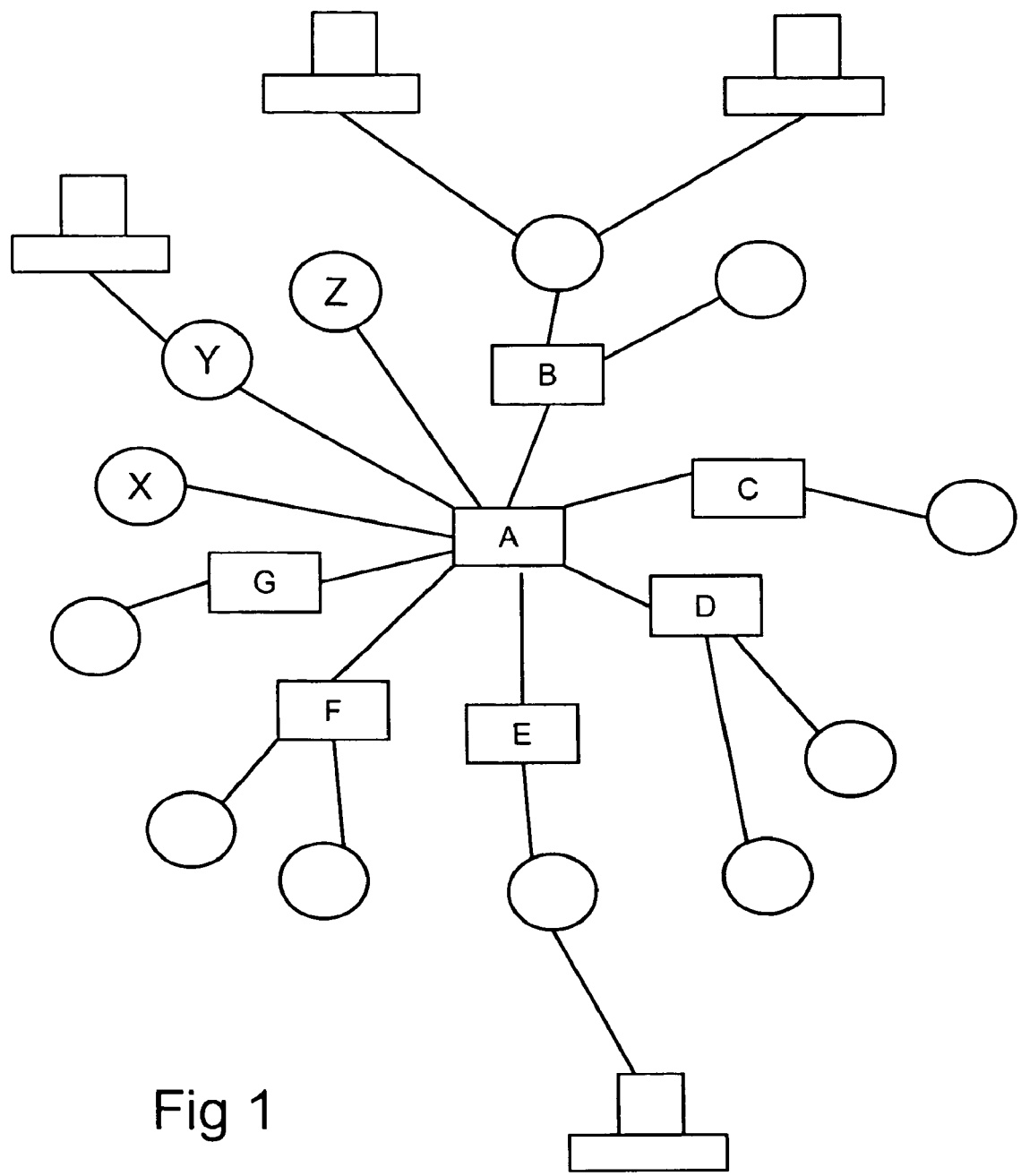
FIG. 1 is a schematic diagram of a VPN topology within a shared network.
Figure 2:
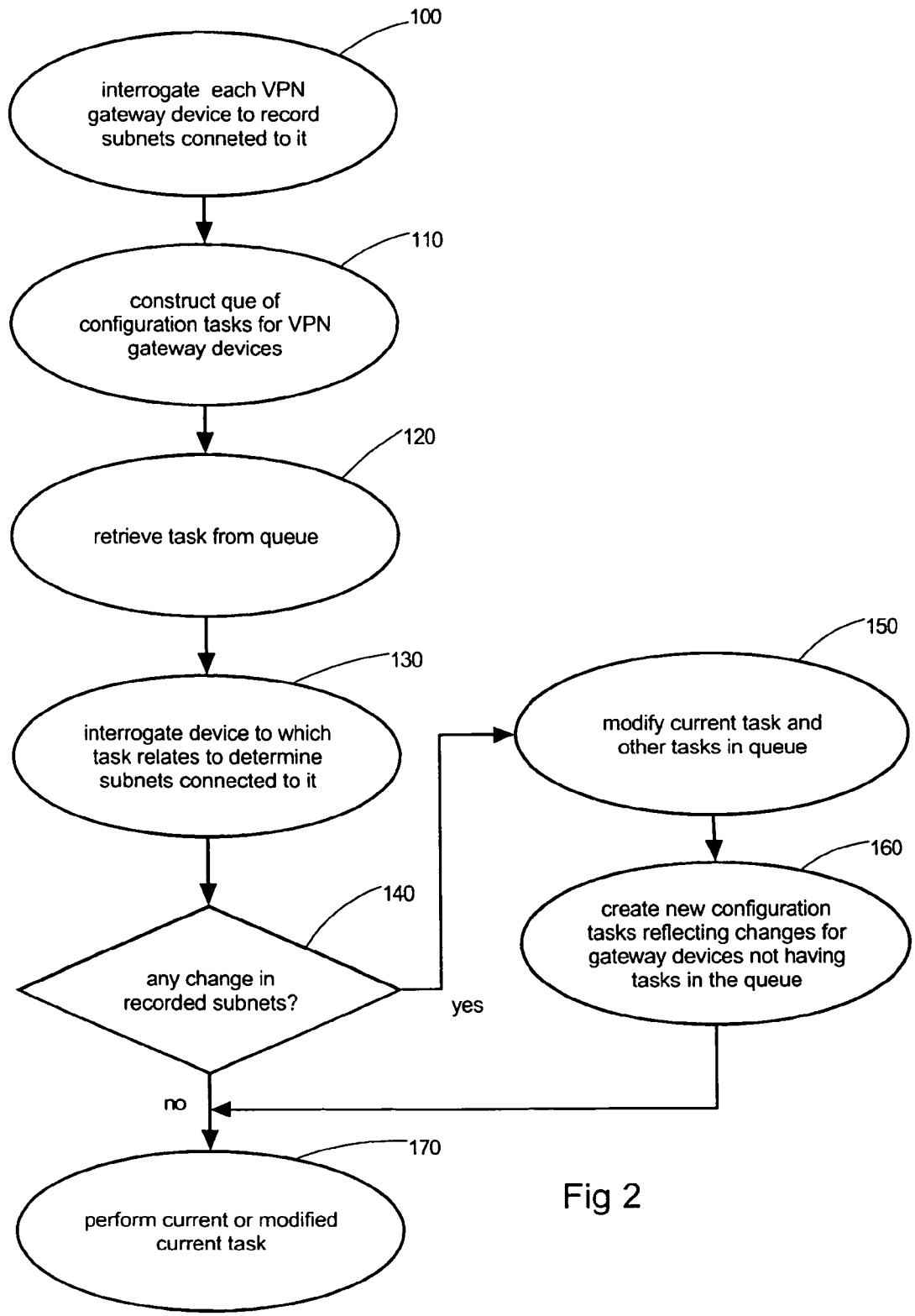
FIG. 2 is a flow diagram of a method of configuring a VPN in accordance with the invention.

Referring to FIG. 1, an example topology and routing rule is:
(a) Use IPSec Tunnel Mode VPN with Shared Secrets and IKE ike1
(b) Use Hub and Spoke topology with device A as the hub and devices B-G as spokes.
(c) Terminate VPNs on zone x on the hub and zone y on all spokes
(d) Spokes can route to all directly connected subnets on other spokes via the hub.
(e) Hub can route to additional subnets X, Y and Z which can be accessed by all spokes Given this information, the wide area network (WAN) IP address of each device, and an automatically generated shared secret for each VPN, the unique VPN configuration (IPSec Security Association) is generated automatically for each device to create a VPN between the hub and each spoke.

Some other possible rule components are:

Use IPSec Transport Mode and Generic Routing Encapsulation (GRE)

Use Full Mesh (each device directly connected ot each other device) or Point-to-Point topologies In Hub and Spoke topologies: spokes have a default route to the hub or spokes can communicate only with the hub Combine multiple topologies into a single "meta topology" (e.g. a Full Mesh topology with each mesh node a hub of a Hub and Spoke topology.

In the above meta topology with mesh node A, B and C: all spokes of hub A can route to all spoke of hub C.

Retrieval and Use of Network Configuration

The directly connected ("internal") subnets on device A (As) are determined in step 100 of FIG. 1, by querying the small network management protocol (SNMP) mib-2.ip.ipAddrTable of device A. The directly connected subnets are determined similarly for devices B to G. This information is combined with the subnets X,Y and Z specified in the VPN rule to generate a different set of static routing configuration (IPSec Destination Subnets) for each device—e.g. the VPN from device B will use destination subnets As+Cs+Ds+Es+Fs+Gs+X+Y+Z, the VPN from C will use As+Bs+Ds+Es+Fs+Gs+X+Y+Z. Device A (the hub) will have 6 VPNs each with destination subnets Bs to Gs respectively.

The configurations for a Full Mesh topology are calculated in a similar way except each device has a single VPN to each other device and can statically route to each subnet on that device. Additional subnets can be specified for any node in the mesh.

A Point-to-Point topology is simply a Full Mesh with only two devices.

The configuration for GRE VPNs are calculated in a similar manner except IP routes are used to configure the static routes instead of IPSec Destination Subnets.

Deployment

Once all of the configurations have been generated, they are deployed using a deployment queue, step 110 in FIG. 1. In very large deployments, this queue will take some time to drain so, when each deployment task for a given device reaches the head of the queue in step 120, the subnets configured on the device are checked again in step 130 using SNMP. If subnets are determined to have been added or removed in step 140, then the configuration for each of the devices in the topology will need to be updated. This is done by adding a new update task for each device in step 150. If a device already has a pending task in the queue then these tasks are merged in step 160. The current unmodified task, or current task merged with the update information created in step 150 is then performed in step 170. The effect is that the minimum number of updates is done. For example, if devices A to C in the Hub and Spoke topology described above have already been configured and then device D is found to have an additional subnet, the details of the update tasks for devices E and F will be modified in the queue and new update tasks for devices A to C will be added to the queue.

Updating Rules

The user can modify the VPN rules during deployment or at a later time and this is likely to require the VPN and/or the routing configuration every device in the topology to be updated. For example if a mesh node is added to a Full Mesh, then a VPN between every other device in the mesh must be added. If a spoke is added to a fully routed Hub and Spoke, a new VPN must be added between the hub and the new spoke and the Destination Subnets for all other spokes must be updated. These update tasks are added/merged into the queue in the same way as described above.

This results in an efficient, scalable algorithm for creating and maintaining statically routed IPSec and GRE VPN networks.

The invention claimed is:

1. A method of configuring a virtual private network (VPN) within a shared network, comprising:
   creating a queue of configuration tasks for gateway devices belonging to the VPN, said configuration tasks including sending static network routing information to said gateway devices; and
   repeatedly retrieving a next task from the queue, wherein the retrieving further comprises:
   interrogating the gateway device to which the task relates, to identify any change in subnetworks connected thereto since the task was created;
   if no change is identified, performing the retrieved task;
   otherwise, if a change is identified, creating update configuration tasks for all relevant gateway devices in the VPN;
   merging the update task for each gateway device with any not yet performed task for that gateway device; and
   performing the task retrieved from the queue merged with the update task.

2. A method as claimed in claim 1, wherein said changes include addition or deletion of subnetworks.

3. A computer program on computer readable medium loadable into a digital computer, said computer program comprising software for pert-brining the steps of claim 1.

4. Apparatus for configuring a virtual private network (VPN) within a shared network, comprising:
   means for creating a queue of configuration tasks for gateway devices belonging to the VPN, said configuration tasks including sending static network routing information to said gateway devices;
   means for repeatedly retrieving a next task from the queue; and
   means for interrogating the gateway device to which the task relates, to identify any change in subnetworks connected thereto since the task was created;
   wherein, if no change is identified, the retrieved task is performed, otherwise if a change is identified, update configuration tasks are created for all relevant gateway devices in the VPN;
   means for merging the update configuration task for each gateway device with any not yet performed task for that gateway device; and
   means for performing the task retrieved from the queue merged with the update task.

5. Apparatus as claimed in claim 3, wherein said changes include addition or deletion of subnetworks.

6. A computer program on computer readable medium loadable into a digital computer, including the following steps:
   creating a queue of configuration tasks for gateway devices belonging to the VPN, said configuration tasks including sending static network routing information to said gateway devices; and
   repeatedly retrieving a next task from the queue, wherein the retrieving further comprises:
   interrogating the gateway device to which the task relates, to identify any change in subnetworks connected thereto since the task was created;
   if no change is identified, performing the retrieved task;
   otherwise, if a change is identified, creating update configuration tasks for all relevant gateway devices in the VPN;
   merging the update task for each gateway device with any not yet performed task for that gateway device; and
   performing the task retrieved from the queue merged with the update task.

* * * * *

UNITED STATES PATENT AND TRADEMARK OFFICE
CERTIFICATE OF CORRECTION

PATENT NO. : 7,584,299 B2 Page 1 of 1
APPLICATION NO. : 11/192771
DATED : September 1, 2009
INVENTOR(S) : Maxwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Fourteenth Day of September, 2010

David J. Kappos
*Director of the United States Patent and Trademark Office*